US011601943B2

(12) United States Patent
Sakhnini et al.

(10) Patent No.: US 11,601,943 B2
(45) Date of Patent: Mar. 7, 2023

(54) TECHNIQUES FOR BANDWIDTH PART HOPPING OVER MULTIPLE COMPONENT CARRIERS IN WIRELESS COMMUNICATIONS

(71) Applicant: QUALCOMM Incorporated, San Diego, CA (US)

(72) Inventors: Iyab Issam Sakhnini, San Diego, CA (US); Tao Luo, San Diego, CA (US); Juan Montojo, San Diego, CA (US); Qiang Wu, San Diego, CA (US); Wanshi Chen, San Diego, CA (US); Wooseok Nam, San Diego, CA (US); Mahmoud Taherzadeh Boroujeni, San Diego, CA (US); Linhai He, San Diego, CA (US); Hwan Joon Kwon, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 7 days.

(21) Appl. No.: 17/244,575

(22) Filed: Apr. 29, 2021

(65) Prior Publication Data
US 2021/0345328 A1 Nov. 4, 2021

Related U.S. Application Data

(60) Provisional application No. 63/018,362, filed on Apr. 30, 2020.

(51) Int. Cl.
*H04W 72/04* (2009.01)
*H04W 72/0453* (2023.01)
*H04L 1/1867* (2023.01)
*H04L 5/00* (2006.01)

(52) U.S. Cl.
CPC ....... *H04W 72/0453* (2013.01); *H04L 1/1893* (2013.01); *H04L 5/0085* (2013.01)

(58) Field of Classification Search
CPC .. H04W 72/0453; H04L 5/0085; H04L 5/001; H04L 5/0012; H04L 5/0094; H04L 5/0092; H04L 1/1864; H04L 1/1896
See application file for complete search history.

(56) References Cited

U.S. PATENT DOCUMENTS

| | | | |
|---|---|---|---|
| 2011/0092242 A1* | 4/2011 | Parkvall | H04W 72/04 455/509 |
| 2012/0069831 A1 | 3/2012 | Miki et al. | |
| 2014/0177576 A1 | 6/2014 | Lindoff et al. | |

(Continued)

OTHER PUBLICATIONS

International Search Report and Written Opinion—PCT/US2021/030311—ISA/EPO—dated Jul. 7, 2021.

(Continued)

*Primary Examiner* — Jamal Javaid
(74) *Attorney, Agent, or Firm* — Arent Fox LLP

(57) ABSTRACT

Aspects described herein relate to receiving or determining an indication of multiple component carriers (CCs) configured wireless communications, communicating in a first bandwidth part (BWP) within a first one of the multiple CCs during a first time period, and communicating, based on a hopping pattern, in a second BWP within a second one of the multiple CCs during a second time period.

30 Claims, 7 Drawing Sheets

(56) References Cited

U.S. PATENT DOCUMENTS

2019/0036665 A1* 1/2019 Park .................... H04L 5/0091
2019/0253200 A1* 8/2019 Salem ............... H04W 74/0808

OTHER PUBLICATIONS

Panasonic: "On PUSCH Enhancements for NR URLLC", 3GPP Draft, 3GPP TSG RAN WG1 Ad-Hoc Meeting 1901, R1-1900674, Panasonic NR URLLC PUSCH Enhancements, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593521, 5 Pages.

* cited by examiner

TECHNIQUES FOR BANDWIDTH PART HOPPING OVER MULTIPLE COMPONENT CARRIERS IN WIRELESS COMMUNICATIONS

CLAIM OF PRIORITY UNDER 35 U.S.C. § 119

The present application for patent claims priority to Provisional Patent Application No. 63/018,362, entitled "TECHNIQUES FOR BANDWIDTH PART HOPPING OVER MULTIPLE COMPONENT CARRIERS IN WIRELESS COMMUNICATIONS" filed Apr. 30, 2020, which is assigned to the assignee hereof and hereby expressly incorporated by reference herein for all purposes.

TECHNICAL FIELD

Aspects of the present disclosure relate generally to wireless communication systems, and more particularly, to frequency hopping.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, frequency hopping over sub-bands of an allocated channel is defined to provide frequency diversity gain and/or mitigate interference.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a transceiver, a memory configured to store instructions, and one or more processors coupled (e.g., communicatively, operationally, electrically, electronically, or otherwise) with the memory and the transceiver, wherein the instructions are executable by the one or more processors to cause the apparatus to receive an indication of multiple component carriers (CCs) configured for communicating with a base station, communicate, with the base station and based on the indication, in a first bandwidth part (BWP) within a first one of the multiple CCs during a first time period, and communicate, with the base station and based on the indication and a hopping pattern, in a second BWP within a second one of the multiple CCs during a second time period.

In another example, an apparatus for wireless communication is provided that includes a transceiver, a memory configured to store instructions, and one or more processors coupled (e.g., communicatively, operationally, electrically, electronically, or otherwise) with the memory and the transceiver, wherein the instructions are executable by the one or more processors to cause the apparatus to: configure multiple CCs for communicating with a user equipment (UE), communicate, with the UE, in a BWP within a first one of the multiple CCs during a first time period, and communicate, with the UE and based on a hopping pattern, in a second BWP within a second one of the multiple CCs during a second time period.

In a further example, a method for wireless communication is provided that includes receiving, by a user equipment, an indication of multiple CCs configured for communicating with a base station, communicating, with the base station and based on the indication, in a first BWP within a first one of the multiple CCs during a first time period, and communicating, with the base station and based on the indication and a hopping pattern, in a second BWP within a second one of the multiple CCs during a second time period.

In yet another example, a method for wireless communication is provided that includes configuring multiple CCs for communicating with a UE, communicating, with the UE, in a first BWP within a first one of the multiple CCs during a first time period, and communicating, with the UE and based on a hopping pattern, in a second BWP within a second one of the multiple CCs during a second time period.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
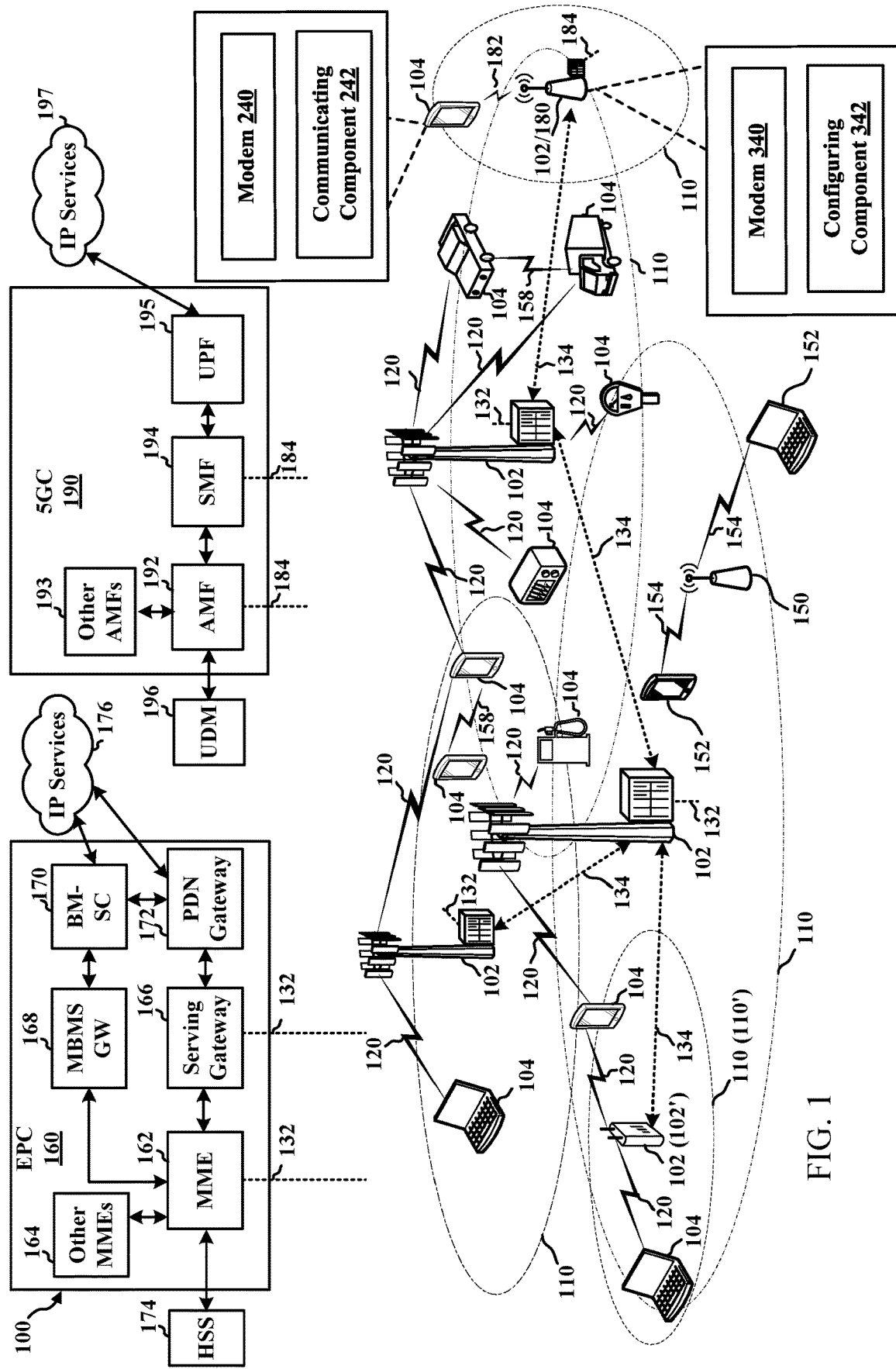
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to configuring frequency hopping for wireless communications over bandwidth parts (BWPs) that may correspond to different component carriers (CCs). Frequency hopping can refer to selecting different frequencies for communications in certain periods of time. For example, wireless network devices can communicate using frequency resources over time resources, where the frequency resources may include certain measures of frequency, such as one or more subcarriers, and the time resources may include a certain period of time (e.g., one millisecond (ms)). The resources may include one or more symbols, such as an orthogonal frequency division multiplexing (OFDM) or single carrier-frequency division multiplexing (SC-FDM) symbol, which can include a number of subcarriers, a BWP (which may be defined by a number of subcarriers), a CC (which may be defined by one or more BWPs and/or a number of subcarriers), etc., over a period of time. The period of time may be defined, for example, by a number of symbols in a slot, where the slot can be of a fixed period of time (e.g., 1 ms). In this example, frequency hopping may refer to using a first frequency (e.g., a first set of subcarriers, BWP, or CC) for communications in a first time period (e.g., a first symbol, collection of symbols, slots, etc.), and then switching to a different second frequency (e.g., a second set of subcarriers, BWP, or CC) for communications in a second time period (e.g., a second symbol, collection of symbols, slots, etc., which may be contiguous or non-contiguous to the first time period (e.g., a first symbol, collection of symbols, slots, etc.) in time).

For example, frequency hopping may have several advantages, including reducing narrow band interference effects and frequency diversity gain. In fifth generation (5G) new radio (NR), for example, at least in frequency range 2 (FR2), beamforming can be used at a gNB and user equipment (UE) to communicate using respective beams, which can result in reduced delay spread in FR2 (e.g., as compared to frequency range 1 (FR1)). The reduced delay spread can lead to larger coherence bandwidth (BW) and hence less gain using frequency hopping within a limited frequency range. To achieve frequency diversity hopping gains in such scenarios, the UE may need to hop across a larger frequency range (across larger BW). For example, in FR2 or other scenarios where beamforming is used and per CC BW may be limited and not wide enough to achieve gains, frequency hopping across BWPs in different CCs can be used to achieve increased frequency diversity gain Aspects described herein relate to configuring a UE to perform frequency hopping over BWPs in different CCs configured by a base station. The UE may or may not support carrier aggregation (CA), but can determine a set of multiple CCs supported by the base station and can perform frequency hopping over BWPs in the multiple CCs in communicating with the base station. For example, communicating with the base station, as described herein, can include one or more of receiving downlink communications from the base station or transmitting uplink communications to the base station. The base station can configure the UE to perform the frequency hopping and/or can similarly perform the frequency hopping in transmitting downlink communications to, or receiving uplink communications from, the UE.

Frequency hopping can refer to communicating on a first frequency at a first time period and them communicating on a second frequency at a second time period. In examples described herein, the UE can receive a downlink communication from the base station in a first downlink BWP over a first CC in a first time period and then can receive the downlink communication (e.g., the same or a different downlink communication) from the base station in a second downlink BWP over a second CC in a second time period. Similarly, for example, the UE can transmit an uplink communication to the base station in a first uplink BWP over a first CC in a first time period and then can transmit the uplink communication (e.g., the same or a different uplink communication) to the base station in a second uplink BWP over a second CC in a second time period. Frequency hopping across CCs, in accordance with aspects described herein, can improve wireless communications, especially in frequency ranges where beamforming is used, as the hopping can be across large portions of bandwidth, which can allow for improved frequency diversity gains, mitigation of interference that may be experienced in certain CCs, etc.

The described features will be presented in more detail below with reference to FIGS. 1-7.

As used in this application, the terms "component," "module," "system" and the like are intended to include a computer-related entity, such as but not limited to hardware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for communicating by performing frequency hopping over BWPs in different CCs, in accordance with aspects described herein. In addition, some nodes may have a modem 340 and configuring component 342 for configuring a device for communicating by performing frequency hopping over BWPs in different CCs, in accordance with aspects described herein. Though a UE 104 is shown as having the modem 240 and communicating component 242 and a base station 102/gNB 180 is shown as having the modem 340 and configuring component 342, this is one illustrative example, and substantially any node or type of node may include a modem 240 and communicating component 242 and/or a modem 340 and configuring component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, communicating component 242 can communicate with a base station 102 (or another device, such as a UE in D2D communications) by frequency hopping over BWPs in different CCs to provide larger frequency diversity gains. For example, the base station 102 can configure multiple CCs over which the UE 104 can communicate (e.g., with the base station or another device). Communicating component 242 can determine a hopping pattern for hopping over the BWPs in different CCs in one or more time periods, where an indication of the hopping pattern or related parameters may be received from the base station 102. Communicating can include transmitting communications to, or receiving communications from, the base station 102 (or other device) based on the hopping pattern.

Figure 2:
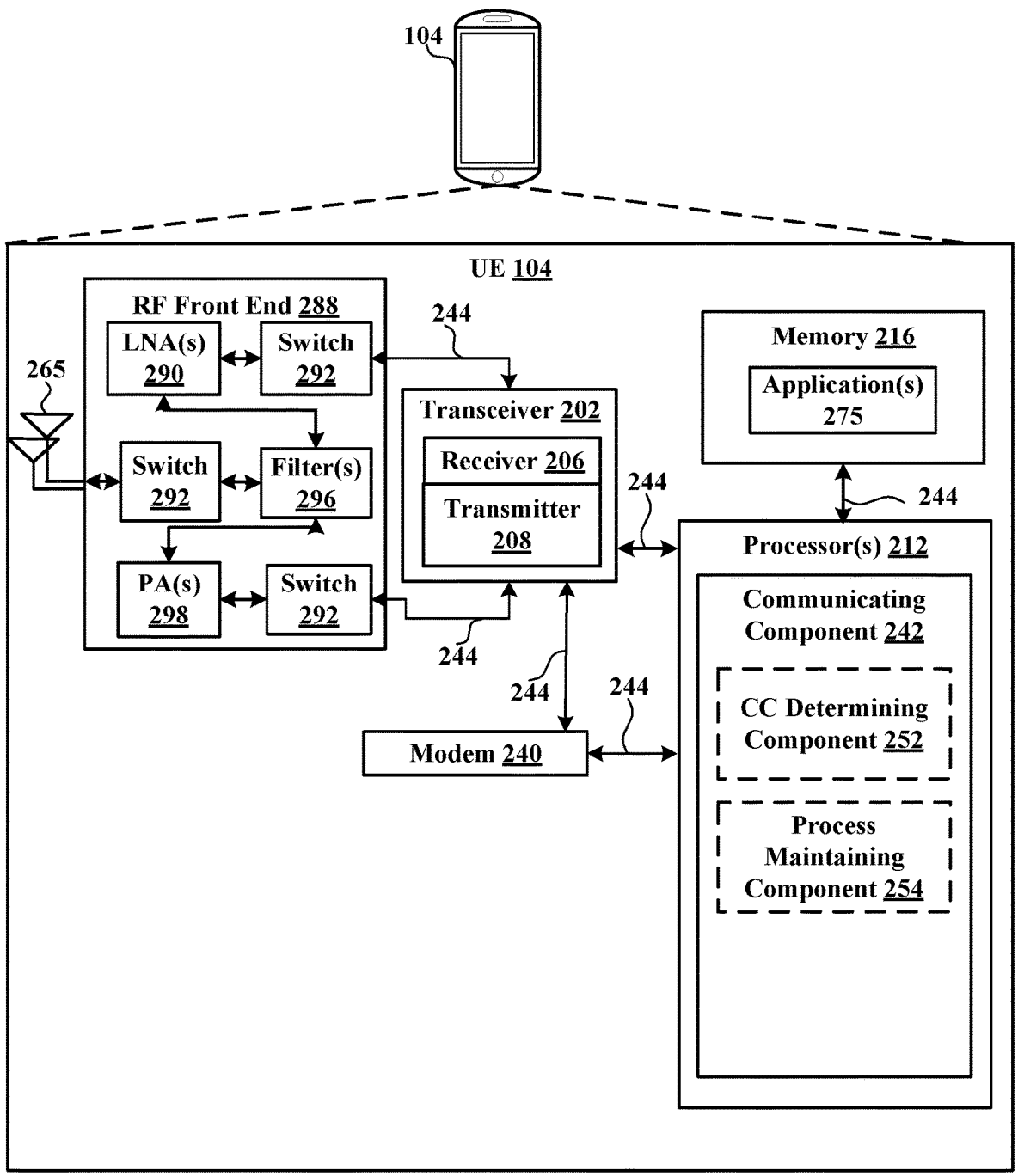
FIG. 2 is a block diagram illustrating an example of a UE, in accordance with various aspects of the present disclosure.
Figure 3:
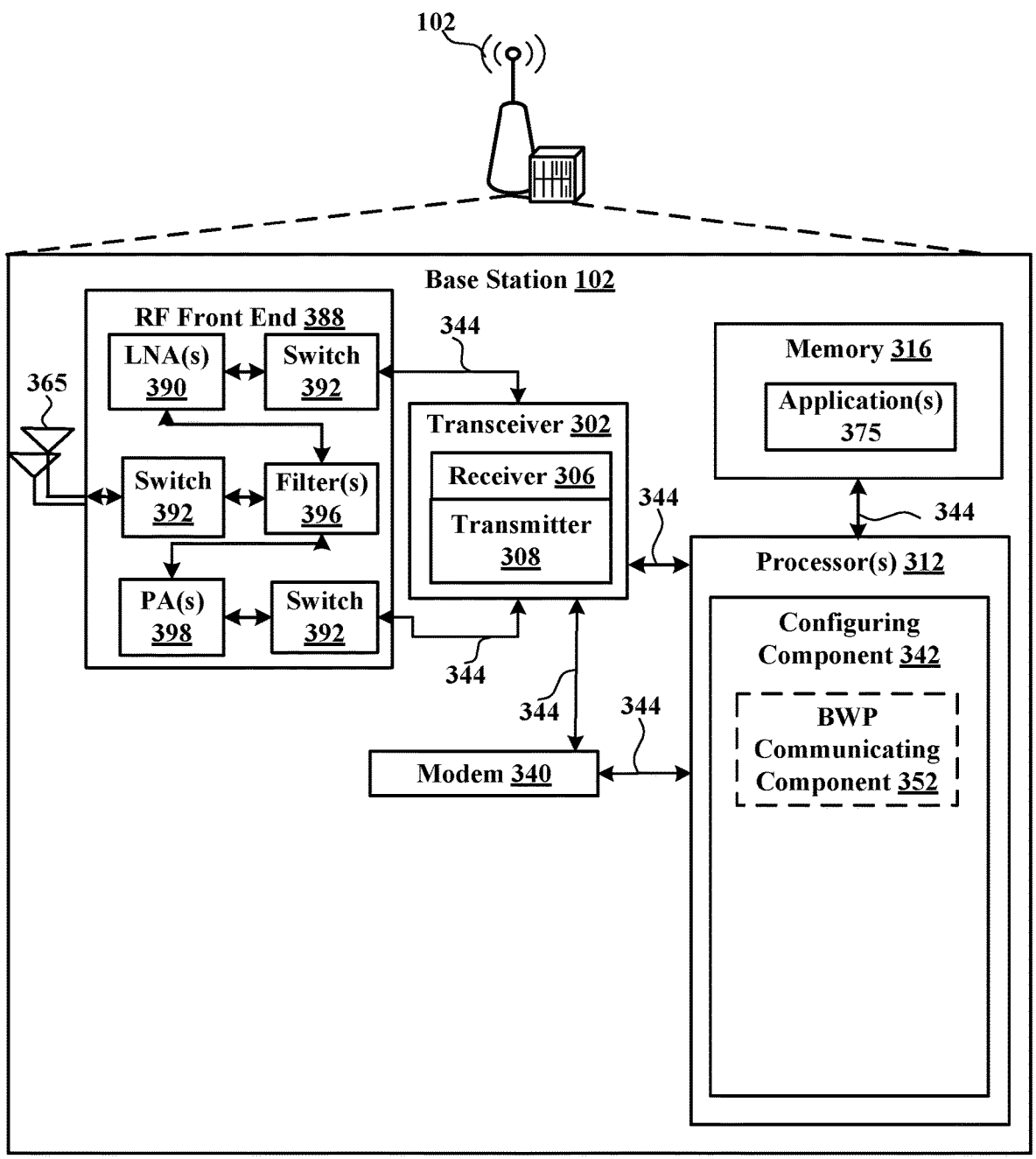
FIG. 3 is a block diagram illustrating an example of a base station, in accordance with various aspects of the present disclosure.
Figure 4:
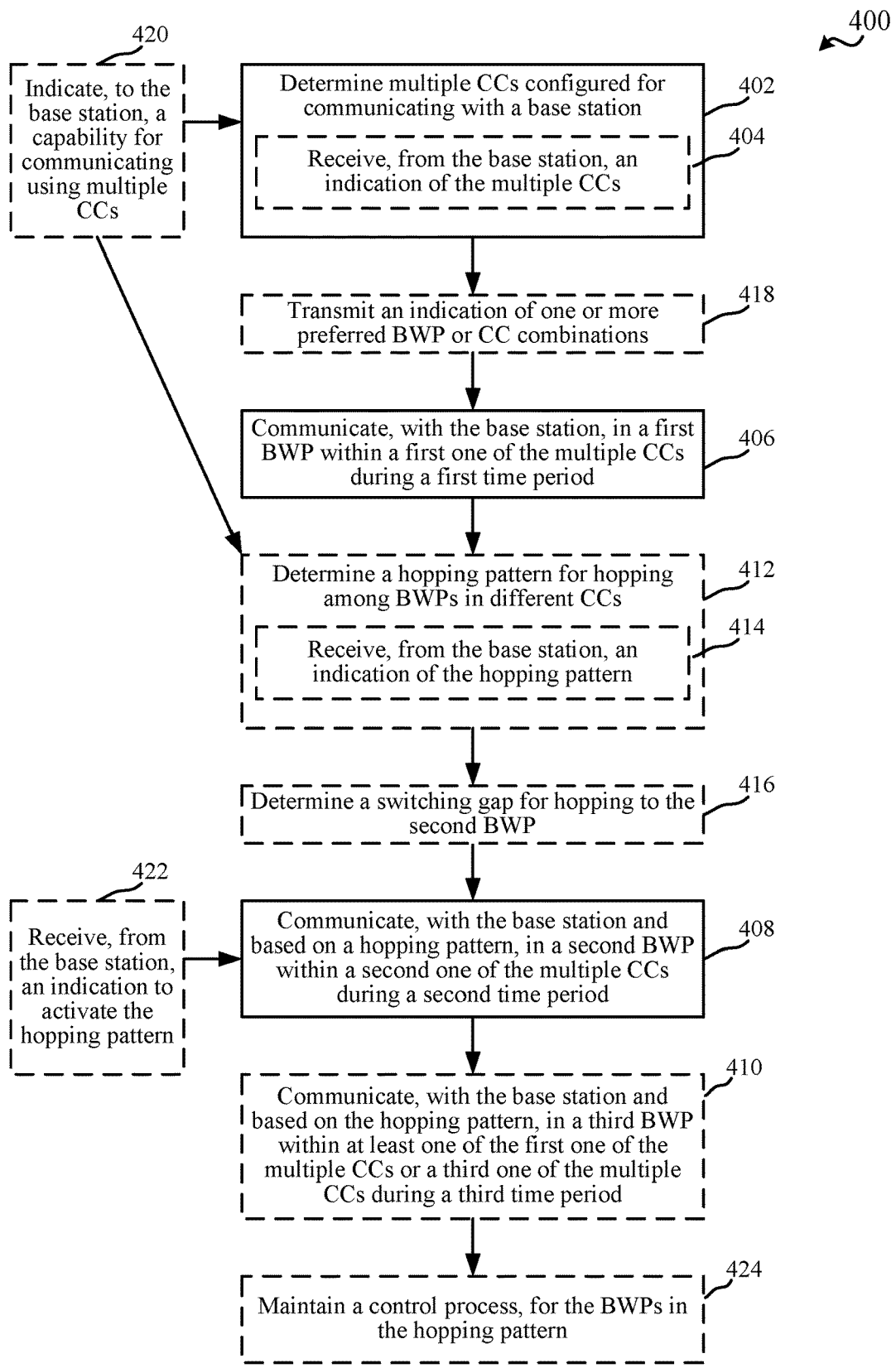
FIG. 4 is a flow chart illustrating an example of a method for communicating using frequency hopping over bandwidth parts (BWPs) in different component carriers (CCs), in accordance with various aspects of the present disclosure.
Figure 5:
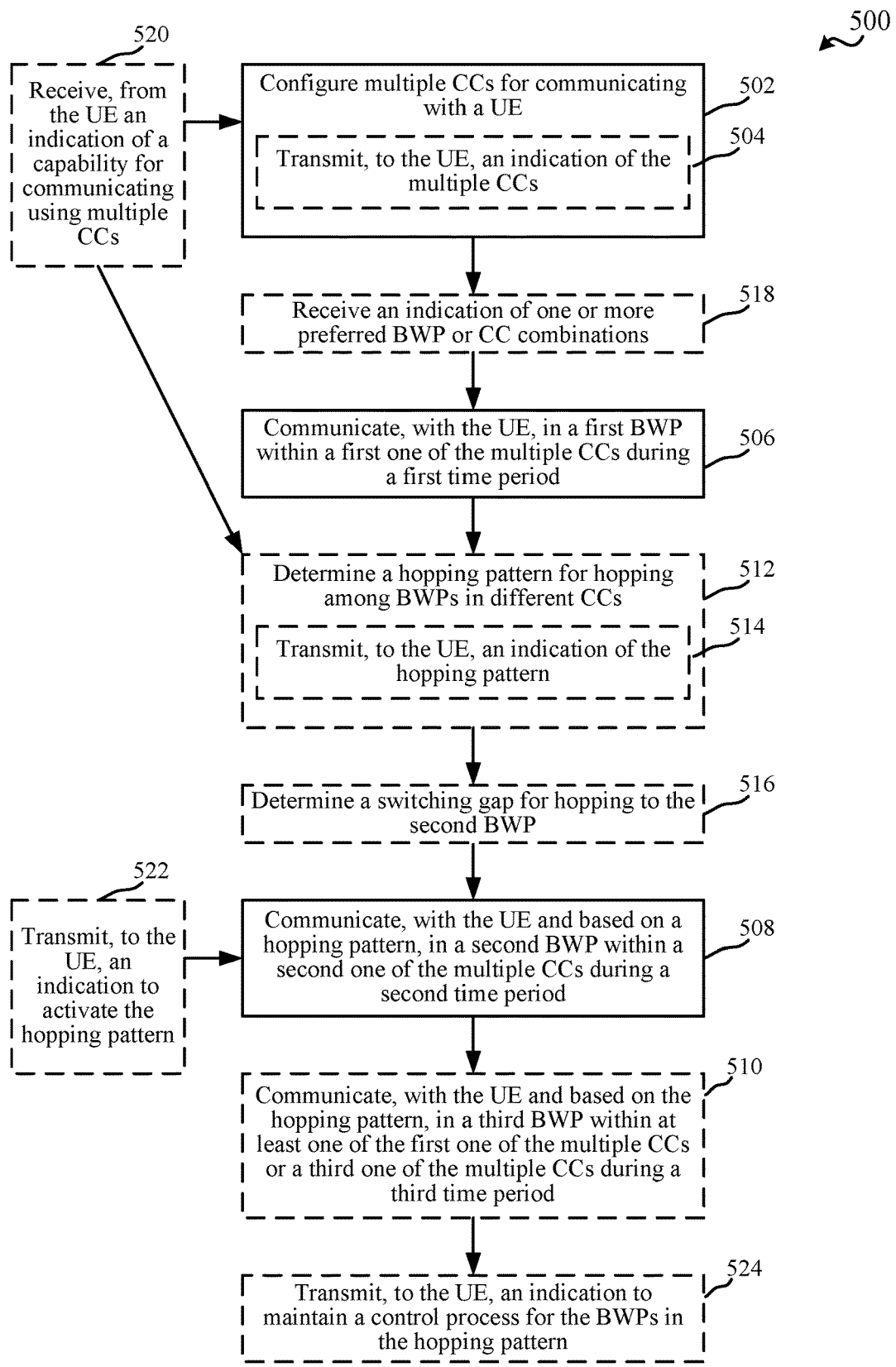
FIG. 5 is a flow chart illustrating an example of a method for configuring multiple CCs for communicating using frequency hopping over BWPs in different ones of the multiple CCs, in accordance with various aspects of the present disclosure.

Turning now to FIGS. 2-7, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 for communicating by performing frequency hopping over BWPs in different CCs, in accordance with aspects described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a CC determining component 252 for determining a set of multiple CCs configured for communicating with a base station 102 (or other device), and/or a process maintaining component 254 for maintaining a process related to communicating over the multiple CCs (e.g., such as a HARQ process, a radio link management (RLM) process, a radio resource measurement (RRM), a beam failure timer, etc.), in accordance with aspects described herein.

In an aspect, the processor(s) 212 may correspond to one or more of the processors described in connection with the UE in FIG. 7. Similarly, the memory 216 may correspond to the memory described in connection with the UE in FIG. 7.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and configuring component 342 for configuring a device for communicating by performing frequency hopping over BWPs in different CCs, in accordance with aspects described herein.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, configuring component 342 can optionally include a BWP communicating component 352 for communicating with a UE over multiple configured BWPs that can frequency hop among different CCs, in accordance with aspects described herein.

In an aspect, the processor(s) 312 may correspond to one or more of the processors described in connection with the base station in FIG. 7. Similarly, the memory 316 may correspond to the memory described in connection with the base station in FIG. 7.

FIG. 4 illustrates a flow chart of an example of a method 400 for communicating using frequency hopping over BWPs in different CCs, in accordance with aspects described herein. FIG. 5 illustrates a flow chart of an example of a method 500 for configuring multiple CCs for communicating using frequency hopping over BWPs in different ones of the multiple CCs, in accordance with aspects described herein. In an example, a UE 104 can perform the functions described in method 400 using one or more of the components described in FIGS. 1 and 2. In an example, a base station 102 can perform the functions described in method 500 using one or more of the components described in FIGS. 1 and 3. Methods 400 and 500 are described below in conjunction with one another to ease explanation of the associated functions and concepts. Methods 400 and 500 are not required to be performed in conjunction with one another, and indeed one device can be configured to perform method 400 without having a corresponding device that performs method 500 and vice versa, in at least one example.

In method 400, at Block 402, multiple CCs configured for communicating with a base station can be determined. In an aspect, CC determining component 252, e.g., in conjunction with processor(s) 212, memory 216, transceiver 202, communicating component 242, etc., can determine the multiple CCs configured for communicating with the base station (or with another device). For example, CC determining component 252 can determine the multiple CCs in a configuration stored in memory 216, a configuration received in signaling from the base station 102, etc. Thus, in one example, in determining the multiple CCs at Block 402, optionally at Block 404, an indication of the multiple CCs can be received from the base station. In an aspect, CC determining component 252, e.g., in conjunction with processor(s) 212, memory 216, transceiver 202, communicating component 242, etc., can receive, from the base station (e.g., base station 102), the indication of the multiple CCs. For example, the base station 102 can configure the multiple CCs in radio resource control (RRC) signaling transmitted to the UE 104 that indicates CCs supported by the base station 102 or otherwise assigned to the UE 104 for communicating with the base station 102. In one example, the configuration may relate to activating CCs for configuring carrier aggregation (CA) for the UE 104. The multiple CCs may each correspond to a different frequency band or range of frequencies within one or more frequency bands.

In method 500, at Block 502, multiple CCs can be configured for communicating with a UE. In an aspect, configuring component 342, e.g., in conjunction with processor(s) 312, memory 316, transceiver 302, etc., can configure the multiple CCs for communicating with the UE. For example, configuring component 342 can determine the multiple CCs to support for communications with UEs. In one example, in configuring the multiple CCs at Block 502, optionally at Block 504, an indication of the multiple CCs can be transmitted to the UE. In an aspect, configuring component 342, e.g., in conjunction with processor(s) 312, memory 316, transceiver 302, etc., can transmit, to the UE (e.g., UE 104), the indication of the multiple CCs. For example, the base station 102 can configure the multiple CCs in RRC signaling transmitted to the UE 104 that indicates CCs supported by the base station 102 or otherwise assigned to the UE 104 for communicating with the base station 102. In one example, the configuration may relate to activating CCs for configuring carrier aggregation (CA) for the UE 104. The multiple CCs may each correspond to a different frequency band or range of frequencies within one or more frequency bands.

In method 400, at Block 406, the base station can be communicated with in a first BWP within a first one of the multiple CCs during a first time period. In an aspect, communicating component 242, e.g., in conjunction with processor(s) 212, memory 216, transceiver 202, etc., can communicate, with the base station, in the first BWP within the first one of the multiple CCs during the first time period. For example, communicating can include transmitting an uplink communication to, or receiving a downlink communication from, the base station 102. In this example, communicating component 242 can communicate with the base station 102 over the BWP in a first CC during the first time period, which may include a symbol (e.g., OFDM symbol, SC-FDM symbol, etc.), a portion of a symbol, multiple symbols in a slot, etc. The BWP may be defined as a span of frequency (e.g., a collection of subcarriers) within the CC. In one example, the first BWP may be configured as an anchor BWP to be used when frequency hopping is disabled or otherwise for communicating a first instance of all communications before hopping frequencies.

Similarly, in method 500, at Block 506, the UE can be communicated with in a first BWP within a first one of the multiple CCs during a first time period. In an aspect, BWP communicating component 352, e.g., in conjunction with processor(s) 312, memory 316, transceiver 302, configuring component 342, etc., can communicate, with the UE, in the first BWP within the first one of the multiple CCs during the first time period. For example, communicating can include transmitting a downlink communication to, or receiving an uplink communication from, the UE 104. In this example, BWP communicating component 352 can communicate with the UE 104 over the BWP in a first CC during the first time period, which may include a symbol, a portion of a symbol, multiple symbols in a slot, etc. As described, in one example, the first BWP may be configured as an anchor BWP to be used when frequency hopping is disabled or otherwise for communicating a first instance of all communications before hopping frequencies. In any case, in an example, the first BWP to use in communicating may be determined by the base station 102 and configured to the UE 104.

In method 400, at Block 408, the base station can be communicated with based on a hopping pattern in a second BWP within a second one of the multiple CCs during a second time period. In an aspect, communicating component 242, e.g., in conjunction with processor(s) 212, memory 216, transceiver 202, etc., can communicate, with the base station and based on a hopping pattern, in the second BWP within the second one of the multiple CCs during the second time period. For example, communicating can include transmitting an uplink communication (e.g., the same or different uplink communication as transmitted in communicating in Block 406) to, or receiving a downlink communication (e.g., the same or different downlink communication as received in communicating in Block 406) from, the base station 102. In this example, communicating component 242 can communicate with the base station 102 over the second BWP in a second CC during the second time period, where the second time period may include a second symbol, a second portion of a symbol, a second slot of multiple symbols, etc. For example, the hopping pattern can indicate to hop from the first BWP in the first one of the multiple CCs to the second BWP in the second one of the multiple CCs (and/or hopping to/from other BWPs in the same or other CCs, as described herein). The hopping pattern can be indicated and stored in memory 216, received in a configuration from the base station 102, etc. In addition, for example, the base station 102 can use the same hopping pattern in communicating with the UE 104.

Thus, for example in method 500, at Block 508, the UE can be communicated with based on a hopping pattern in a second BWP within a second one of the multiple CCs during a second time period. In an aspect, BWP communicating component 352, e.g., in conjunction with processor(s) 312, memory 316, transceiver 302, configuring component 342, etc., can communicate, with the UE and based on the hopping pattern, in the second BWP within the second one of the multiple CCs during the second time period. For example, communicating can include transmitting a downlink communication (e.g., the same or different downlink communication as transmitted in communicating in Block 506) to, or receiving an uplink communication (e.g., the same or different uplink communication as received in communicating in Block 506) from, the UE 104. In this example, communicating component 242 can communicate with the UE 104 over the second BWP in a second CC during the second time period, where the second time period may include a second symbol, a second portion of a symbol, a second slot of multiple symbols, etc. For example, the hopping pattern can indicate to hop from the first BWP in the first one of the multiple CCs to the second BWP in the second one of the multiple CCs (and/or hopping to/from other BWPs in the same or other CCs, as described herein). The hopping pattern can be indicated and stored in memory 316, or otherwise indicated in a configuration by the base station 102 (e.g., and transmitted to the UE 104, as described further herein), such that the base station 102 and UE 104 can use the same hopping pattern.

Figure 6:
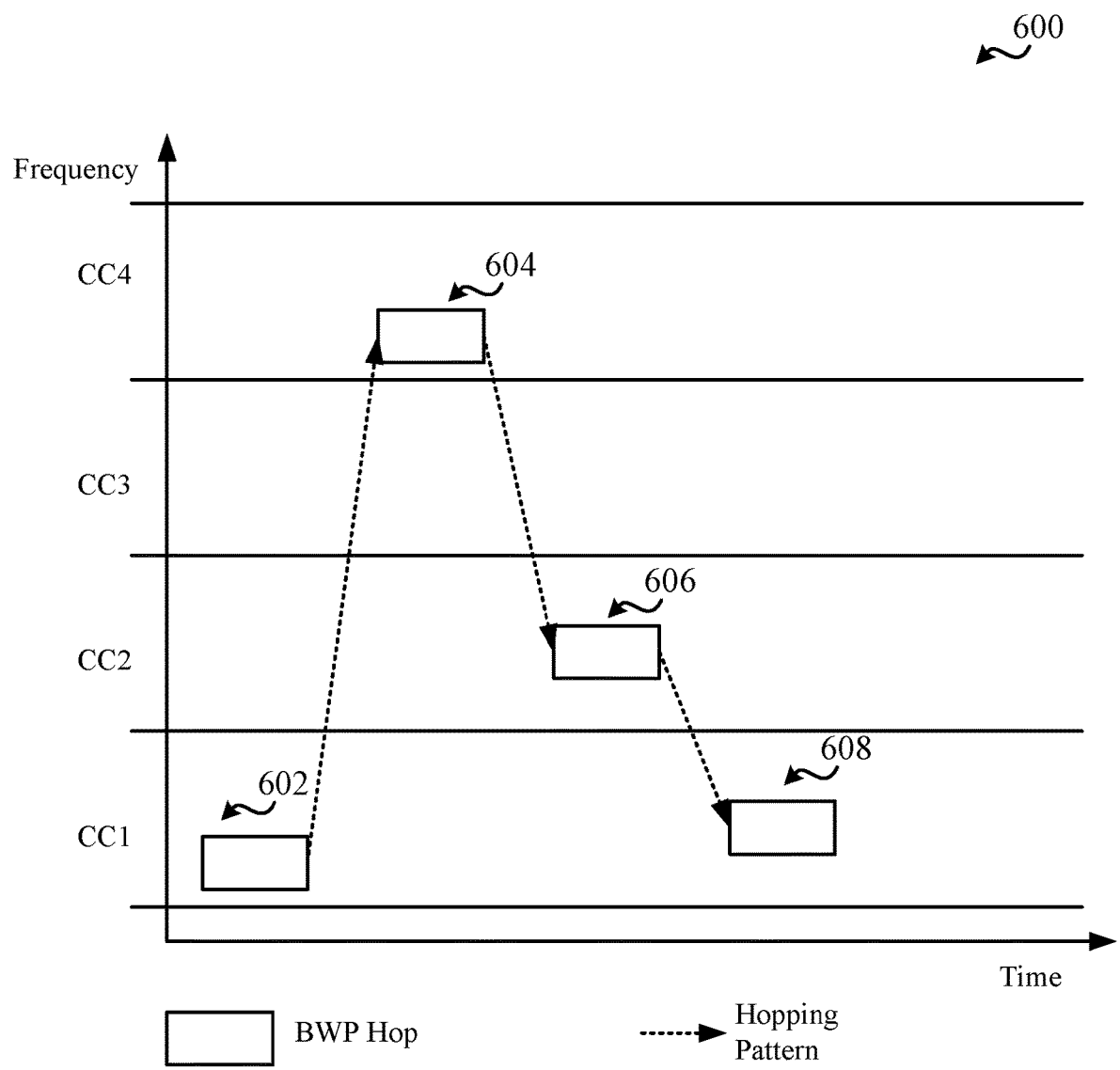
FIG. 6 illustrates an example of a CC configuration in BWPs over a period of time, in accordance with various aspects of the present disclosure.

An example is shown in FIG. 6, which illustrates an example of a CC configuration 600 over a period of time. In this example, the UE 104 and/or base station 102 are configured to communicate using BWP 602 in CC1 in a first time period, and then to hop to BWP 604 in CC4 in a second time period for communicating. The UE 104 and/or base station 102 are then also configured to hop to BWP 606 in CC2 in a third time period and hop to BWP 608 in CC1 in a fourth time period. UE 104 and base station 102 can operate based on a hopping pattern in this regard that can indicate the BWPs 602, 604, 606, 608 to use in the hopping pattern, a switching gap indicating a period of time by which to hop and communicate over the BWP, etc. In this regard, as shown, the BWP hopping bandwidth can be within (e.g., less than or equal to) the bandwidth of the configured CCs (e.g., CC1, CC2, CC3, CC4).

In addition, in an example in method 400, optionally at Block 410, the base station can be communicated with based on the hopping pattern in a third BWP within at least one of the first one of the multiple CCs or a third one of the multiple CCs during a third time period. In an aspect, communicating component 242, e.g., in conjunction with processor(s) 212, memory 216, transceiver 202, etc., can communicate, with the base station and based on the hopping pattern, in the third BWP within the at least one of the first one of the multiple CCs or a third one of the multiple CCs during the third time period. For example, communicating can include transmitting an uplink communication (e.g., the same or different uplink communication as transmitted in communicating in Blocks 406, 408) to, or receiving a downlink communication (e.g., the same or different downlink communication as received in communicating in Blocks 406, 408) from, the base station 102. In this example, communicating component 242 can communicate with the base station 102 over the third BWP during the third time period, where the third time period may include a third symbol, a third portion of a symbol, a third slot of multiple symbols, etc. For example, the hopping pattern can indicate to hop from the second BWP to the third BWP (and/or hopping to/from other BWPs in the same or other CCs, as described herein). In one example, the third BWP may be the same as the first BWP, such that the UE 104 hops from the first BWP to the second BWP and then back to the first BWP in corresponding time periods.

Thus, for example in method 500, at Block 510, the UE can be communicated in a third BWP within at least one of the first of the multiple CCs or a third one of the multiple CCs during a third time period. In an aspect, BWP communicating component 352, e.g., in conjunction with processor(s) 312, memory 316, transceiver 302, configuring component 342, etc., can communicate, with the UE, in the third BWP within at least one of the first one of the multiple CCs or the third one of the multiple CCs during the third time period. For example, communicating can include transmitting a downlink communication (e.g., the same or different downlink communication as transmitted in communicating in Block 506, 508) to, or receiving an uplink communication (e.g., the same or different uplink communication as received in communicating in Block 506, 508) from, the UE 104. In this example, communicating component 242 can communicate with the UE 104 over the third BWP during the third time period, which may include a third symbol, a third portion of a symbol, a third slot of multiple symbols, etc. For example, the hopping pattern can indicate to hop from the second BWP to the third BWP (and/or hopping to/from other BWPs in the same or other CCs, as described herein).

In some examples, the hopping pattern can be intra-band or inter-band such that CCs indicated in the hopping pattern are within the same system band or in different system bands. In addition, for example, the hopping pattern may be based on per CC configuration of BWP hops. For example, the configuration of the multiple CCs may indicate a different subcarrier spacing (SCS) per CC (e.g., where frequency hopping can be between BWPs that are spaced in frequency according to the SCS), different hop durations or hopping bandwidth (e.g., the time or frequency between hops) per CC, etc. The hopping pattern can be defined based on the per CC configurations in this regard, for example, and the SCS, hopping durations, or hopping bandwidths available for hopping within each CC, can be different. This can be reflected in a hopping pattern generated by the base station 102, as described further herein, or otherwise used by the UE 104 in determining parameters for hopping based on a hopping pattern, etc. Moreover, as described in an example, the hopping pattern may indicate or include an anchor/default BWP/CC combination. In an example, the anchor/default BWP/CC may not be allowed to hop. In another example, the UE can fall back to the anchor/default BWP/CC to communicate over the anchor/default BWP/CC in certain scenarios, such as where an inactivity timer expires indicating a threshold period of inactivity at the UE 104 (e.g., and thus possible failure over the current BWP/CC).

In method 400, optionally at Block 412, a hopping pattern for hopping among BWPs in different CCs can be determined. In an aspect, communicating component 242, e.g., in conjunction with processor(s) 212, memory 216, transceiver 202, etc., can determine the hopping pattern for hopping among BWPs in different CCs. In one example, the hopping pattern can be configured in the UE 104 (e.g., in memory 216) and/or may be generic for substantially any combination of CCs (e.g., hop from an anchor or default BWP in a lowest index or frequency CC to a BWP in a highest or next index or frequency CC, etc.). In another example, optionally at Block 414, an indication of the hopping pattern can be received from the base station. In an aspect, communicating component 242, e.g., in conjunction with processor(s) 212, memory 216, transceiver 202, etc., can receive, from the base station (e.g., base station 102), the indication of the hopping pattern. For example, communicating component 242 can receive the hopping pattern from the base station 102 semi-statically in RRC signaling or dynamically using downlink control information (DCI) or media access control (MAC)-control element (CE), etc.

In method 500, optionally at Block 512, a hopping pattern for hopping among BWPs in different CCs can be determined. In an aspect, configuring component 342, e.g., in conjunction with processor(s) 312, memory 316, transceiver 302, etc., can determine the hopping pattern for hopping among BWPs in different CCs. In one example, the hopping pattern can be configured by the base station 102 based on one or more parameters, such as the CCs configured by the base station 102 (e.g., for the UE 104), a level or measure of utilization of the CC by the UE 104 and/or other UEs, a measure of channel quality over the CC, BWP and/or desired CC combinations indicated by the UE 104, etc., as described further herein. In another example, the hopping pattern may be generic for substantially any combination of CCs (e.g., hop from an anchor or default BWP in a lowest index or frequency CC to a BWP in a highest or next index or frequency CC, etc.), and/or the like. In another example, optionally at Block 514, an indication of the hopping pattern can be transmitted to the UE. In an aspect, configuring component 342, e.g., in conjunction with processor(s) 312, memory 316, transceiver 302, etc., can transmit, to the UE (e.g., UE 104), the indication of the hopping pattern. For example, configuring component 342 can transmit the indication of the hopping pattern to the UE 104 semi-statically in RRC signaling or dynamically using downlink control information (DCI) or media access control (MAC)-control element (CE), etc.

For example, the configured hopping pattern may explicitly indicate BWP and CC combinations over which to hop in a time period. The hopping pattern may indicate the BWP and/or CC by an index (e.g., related to a previous configuration, such as CC1, CC2, CC3, CC4), by an associated frequency (e.g., such as center frequency, starting frequency, frequency span, etc.), and/or the like. In an example, the hopping pattern can be indicated as a series of pairs of BWP and CC. The hopping pattern may specify additional parameters as well, such as a BWP and/or CC to be considered as an anchor or default BWP or CC (or BWP/CC pair), a switching gap as a period of time during which to switch frequencies according to the hopping pattern, etc.

In method 400, optionally at Block 416, a switching gap for hopping to the second BWP can be determined. In an aspect, communicating component 242, e.g., in conjunction with processor(s) 212, memory 216, transceiver 202, etc., can determine the switching gap for hopping to the second BWP. In one example, the hopping pattern can specify the switching gap, as described. The switching gap may be specified as a number of milliseconds (ms) or other time measurement to wait before switching to the second BWP (or by which to switch to the second BWP) or additional BWPs. In one example, communicating component 242 can determine the switching gap based on a type or size of hop between the first BWP and the second BWP (or more generally between one BWP and the next BWP). For example, switching gap may be defined separately for one or more of hopping within a CC (e.g., where one BWP and the next BWP are within the same CC), hopping intra-band CC (e.g., where the CC for the one BWP and the CC for the next BWP are within the same frequency band), or hopping inter-band CC (e.g., where the CC for the one BWP and the CC for the next BWP are in different frequency bands).

In method 500, optionally at Block 516, a switching gap for hoping to the second BWP can be determined. In an aspect, configuring component 342, e.g., in conjunction with processor(s) 312, memory 316, transceiver 302, etc., can determine the switching gap for hopping to the second BWP. In one example, configuring component 342 can transmit an indication of the switching gap to the UE 104.

In method 400, optionally at Block 418, an indication of one or more preferred BWP or CC combinations can be transmitted. In an aspect, communicating component 242, e.g., in conjunction with processor(s) 212, memory 216, transceiver 202, etc., can transmit the indication of one or more preferred BWP or CC combinations. For example, communicating component 242 can determine the preferred CCs based on the multiple CCs configured for communicating with the base station. In this example, communicating component 242 can transmit the indication including an identifier of the BWP (e.g., an associated index, center frequency, starting frequency, frequency span, etc.) and an identifier of the CC (e.g., an index within or specified by a configuration that indicate the multiple CCs), etc. In an example, the hopping pattern can be determined based on the indicated preferred BWP/CC combinations, which can include receiving the hopping pattern at Block 414 as at least one of an acknowledgement of using the indicated BWP/CC combinations (e.g., in an order specified, which can be the hopping pattern), a hopping pattern indicating the BWP/CCs for hopping by an index based on an order that the BWP/CCs are reported in the indication, etc.

In method 500, optionally at Block 518, an indication of one or more preferred BWP or CC combinations can be received. In an aspect, configuring component 342, e.g., in conjunction with processor(s) 312, memory 316, transceiver 302, etc., can receive the indication of one or more preferred BWP or CC combinations. For example, configuring component 342 can receive the indication including an identifier of the BWP (e.g., an associated index, center frequency, starting frequency, frequency span, etc.) and an identifier of the CC (e.g., an index within or specified by a configuration that indicate the multiple CCs), etc. In an example, configuring component 342 can determine the hopping pattern based on the indicated preferred BWP/CC combinations, which can include transmitting the hopping pattern at Block 514 as at least one of an acknowledgement of using the indicated BWP/CC combinations (e.g., in an order specified, which can be the hopping pattern), a hopping pattern indicating the BWP/CCs for hopping by an index based on an order that the BWP/CCs are reported in the indication, etc.

In method 400, optionally at Block 420, a capability for communicating using multiple CCs can be indicated to the base station. In an aspect, communicating component 242, e.g., in conjunction with processor(s) 212, memory 216, transceiver 202, etc., can indicate, to the base station, the capability for communicating using multiple CCs. For example, communicating component 242 can indicate the capability as a capability of generally supporting BWP hopping over multiple CCs or can otherwise specify certain CCs over which hopping is supported. The indication of the capability, in this regard, can be used to determine CCs configured for communicating with the base station (e.g., as a subset of certain CCs indicated) at Block 402 and/or in determining the hopping pattern at Block 412.

In method 500, optionally at Block 520, a capability for communicating using multiple CCs can be received from the UE. In an aspect, configuring component 342, e.g., in conjunction with processor(s) 312, memory 316, transceiver 302, etc., can receive, from the UE, the indication of the capability for communicating using multiple CCs. As described, for example, the capability can be indicated as a capability of generally supporting BWP hopping over multiple CCs or can otherwise specify certain CCs over which hopping is supported. In an example, configuring component 342 can use the indication of the capability, in this regard, to configure multiple CCs for communicating with the UE (e.g., as a subset of certain CCs indicated) at Block 502 and/or in determining the hopping pattern at Block 512.

In method 400, optionally at Block 422, an indication to activate the hopping pattern can be received from the base station. In an aspect, communicating component 242, e.g., in conjunction with processor(s) 212, memory 216, transceiver 202, etc., can receive, from the base station, the indication to activate (or deactivate) the hopping pattern. For example, once configured, the hopping pattern can be activated and/or deactivated by the base station based on a command transmitted using RRC, MAC-CE, DCI, etc. Communicating component 242 can accordingly activate the hopping pattern for hopping to the second BWP based on the indication.

In method 500, optionally at Block 522, an indication to activate the hopping pattern can be transmitted to the UE. In an aspect, configuring component 342, e.g., in conjunction with processor(s) 312, memory 316, transceiver 302, etc., can transmit, to the UE, the indication to activate (or deactivate) the hopping pattern. BWP communicating component 352 can accordingly communicate based on the hopping pattern where the indication to activate the hopping pattern is transmitted to the UE.

In method 400, optionally at Block 424, a control process can be maintained for the BWPs in the hopping pattern. In an aspect, process maintaining component 254, e.g., in conjunction with processor(s) 212, memory 216, transceiver 202, communicating component 242, etc., can maintain the control process for the BWPs that are part of the hopping pattern. For example, the control process can include at least one of a HARQ process, a RLM process, a RRM, or a beam failure timer (e.g., a beam failure detection (BFD) and/or beam failure recovery (BFR) timer), etc. Process maintaining component 254 can determine whether to maintain the control process (or each of multiple control processes) to be transparent to BWP hops across CCs, to be transparent to BWP hops within the same CC, to be maintained separately per BWP, etc. In the examples provided above, this can correspond to determining whether to maintain a single control process for both of the first BWP and the second BWP (e.g., all BWPs 602, 604, 606, 608), whether to maintain a single control process for both of the first BWP and a third BWP within the first one of the multiple CCs, (e.g., single control process for BWPs 602, 608 in CC1, separate control process for BWP 604, and separate control process for BWP 606), or whether to maintain separate control processes for each of the first BWP and the second BWP (e.g., separate for all BWPs 602, 604, 606, 608). In one example, an indication of whether to maintain the control process (or each of multiple control processes) in this regard can be indicated in signaling to the UE.

For example, whether to maintain the control process(es) separately or together for the BWPs (or for BWPs in the same or different CCs) can impact corresponding functions performed based on the control process(es). For example, where process maintaining component 254 maintains a different BFD timer for different BWPs, a given BFD timer can run when a corresponding BWP is being used (but perhaps not when another BWP is being used) for detecting BFD for the corresponding BWP.

In method 500, optionally at Block 524, an indication to maintain a control process for the BWPs in the hopping pattern can be transmitted to the UE. In an aspect, configuring component 342, e.g., in conjunction with processor(s) 312, memory 316, transceiver 302, etc., can transmit, to the UE, the indication to maintain the control process for the BWPs that are part of the hopping pattern. For example, the indication can indicate that the UE is to maintain the control process or can otherwise specify how the UE is to maintain the control process across multiple BWPs (e.g., as transparent to BWP hops across CCs, as transparent to BWP hops within CCs, separately for all BWPs regardless of CC, etc.).

Figure 7:
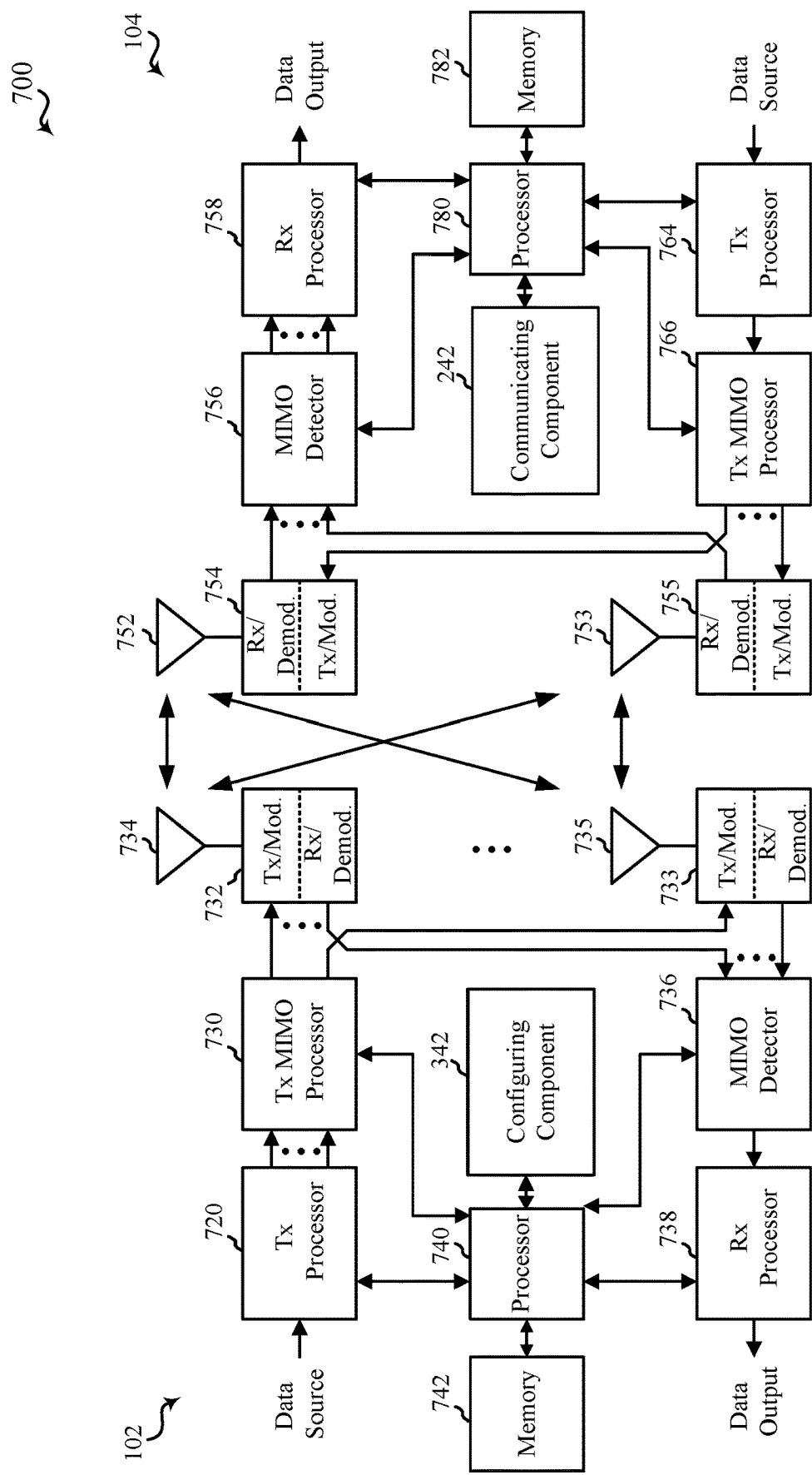
FIG. 7 is a block diagram illustrating an example of a MIMO communication system including a base station and a UE, in accordance with various aspects of the present disclosure.

FIG. 7 is a block diagram of a MIMO communication system 700 including a base station 102 and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1-2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 104 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The processor 740 may in some cases execute stored instructions to instantiate a configuring component 342 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 700. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 700.

The following aspects are illustrative only and aspects thereof may be combined with aspects of other embodiments or teaching described herein, without limitation.

Aspect 1 is a method for wireless communication including receiving or determining, by a user equipment, multiple CCs configured for communicating with a base station, communicating, with the base station, in a BWP within a first one of the multiple CCs during a first time period, and communicating, with the base station and based on a hopping pattern, in a second BWP within a second one of the multiple CCs during a second time period.

In Aspect 2, the method of Aspect 1 includes communicating, with the base station and based on the hopping pattern, in a third BWP within at least one of the first one of the multiple CCs or a third one of the multiple CCs during a third time period.

In Aspect 3, the method of any of Aspects 1 or 2 includes where the first one of the multiple CCs and the second one of the multiple CCs are within a same or different frequency band.

In Aspect 4, the method of any of Aspects 1 to 3 includes indicating, to the base station, a capability for communicating using certain CCs, where the multiple CCs are a subset of the certain CCs.

In Aspect 5, the method of any of Aspects 1 to 4 includes maintaining at least one of a single HARQ process, a single RLM process, a RRM, or a beam failure timer for both of the first BWP and the second BWP.

In Aspect 6, the method of any of Aspects 1 to 5 includes maintaining at least one of a single HARQ process, a single RLM process, a RRM, or a beam failure timer for both of the first BWP and a third BWP within the first one of the multiple CCs.

In Aspect 7, the method of any of Aspects 1 to 6 includes maintaining at least one of a single HARQ process, a single RLM process, a RRM, or a beam failure timer for each of the first BWP and the second BWP.

In Aspect 8, the method of any of Aspects 1 to 7 includes determining, based on a configuration received from the base station, whether to maintain at least one of a single HARQ process, a single RLM process, a RRM, or a beam failure timer for either both of the first BWP and the second BWP, both of the first BWP and a third BWP within the first one of the multiple CCs, or each of the first BWP and the second BWP.

In Aspect 9, the method of any of Aspects 1 to 8 includes receiving, from the base station in RRC signaling, a MAC-CE, or DCI, an indication of the hopping pattern.

In Aspect 10, the method of any of Aspects 1 to 9 includes receiving, from the base station in RRC signaling, a MAC-CE, or DCI, an indication to activate or deactivate the hopping pattern.

In Aspect 11, the method of any of Aspects 1 to 10 includes where each of the multiple CCs are configured with different SCS.

In Aspect 12, the method of any of Aspects 1 to 11 includes where the hopping pattern indicates at least one of different hopping durations or different hopping bandwidths within one or more of the multiple CCs.

In Aspect 13, the method of any of Aspects 1 to 12 includes where the first BWP is configured as an anchor BWP for using when the hopping pattern is deactivated.

In Aspect 14, the method of any of Aspects 1 to 13 includes determining a switching gap for hopping to the second BWP to communicate in the second time period, where determining the switching gap is based on at least one of an indicated capability, or whether the first one of the multiple CCs and the second of the multiple CCs are within a same or different frequency band.

In Aspect 15, the method of any of Aspects 1 to 14 includes determining a switching gap for hopping from the first BWP to another BWP to communicate in another time period, where determining the switching gap is based on whether the first BWP and the another BWP are within the first one of the multiple CCs or in separate ones of the multiple CCs.

In Aspect 16, the method of any of Aspects 1 to 15 includes indicating, to the base station, one or more preferred hopping BWP or CC combinations, and receiving, from the base station and based on the one or more preferred hopping BWP or CC combinations, the hopping pattern.

Aspect 17 is a method for wireless communication including configuring multiple CCs configured for communicating with a UE, communicating, with the UE, in a first BWP within a first one of the multiple CCs during a first time period, and communicating, with the UE and based on a hopping pattern, in a second BWP within a second one of the multiple CCs during a second time period.

In Aspect 18, the method of Aspect 17 includes, communicating, with the UE and based on the hopping pattern, in a third BWP within at least one of the first one of the multiple CCs or a third one of the multiple CCs during a third time period.

In Aspect 19, the method of any of Aspects 17 or 18 includes where the first one of the multiple CCs and the second one of the multiple CCs are within a same or different frequency band.

In Aspect 20, the method of any of Aspects 17 to 19 includes receiving, from the UE, an indication of a capability for communicating using certain CCs, where the multiple CCs are a subset of the certain CCs.

In Aspect 21, the method of any of Aspects 17 to 20 includes receiving, from the UE, feedback related to communications for both of the first BWP and the second BWP.

In Aspect 22, the method of any of Aspects 17 to 21 includes receiving, from the UE, feedback related to communications for both of the first BWP and a third BWP within the first one of the multiple CCs.

In Aspect 23, the method of any of Aspects 17 to 22 includes receiving, from the UE, feedback related to communications for each of the first BWP and the second BWP.

In Aspect 24, the method of any of Aspects 17 to 23 includes transmitting, to the UE, a configuration indicating whether to maintain at least one of a single HARQ process, a RLM process, a RRM, or a beam failure timer for either both of the first BWP and the second BWP, both of the first BWP and a third BWP within the first one of the multiple CCs, or each of the first BWP and the second BWP.

In Aspect 25, the method of any of Aspects 17 to 24 includes transmitting, to the UE in RRC signaling, a MAC-CE, or DCI, an indication of the hopping pattern.

In Aspect 26, the method of any of Aspects 17 to 25 includes transmitting, to the UE in RRC signaling, a MAC-CE, or DCI, an indication to activate or deactivate the hopping pattern.

In Aspect 27, the method of any of Aspects 17 to 26 includes where each of the multiple CCs are configured with different SCS.

In Aspect 28, the method of any of Aspects 17 to 27 includes transmitting, to the UE, an indication of the hopping pattern, where the indication of the hopping pattern indicates at least one of different hopping durations or different hopping bandwidths within one or more of the multiple CCs.

In Aspect 29, the method of any of Aspects 17 to 28 includes configuring the first BWP as an anchor BWP for using when the hopping pattern is deactivated.

In Aspect 30, the method of any of Aspects 17 to 29 includes transmitting, to the UE, an indication of a switching gap for hopping to the second BWP to communicate in the second time period, where the switching gap is based on at least one of an indicated capability, or whether the first one of the multiple CCs and the second of the multiple CCs are within a same or different frequency band.

In Aspect 31, the method of any of Aspects 17 to 30 includes transmitting, to the UE, an indication of a switching gap for hopping from the first BWP to another BWP to communicate in another time period, where the switching gap is based on whether the first BWP and the another BWP are within the first one of the multiple CCs or in separate ones of the multiple CCs.

In Aspect 32, the method of any of Aspects 17 to 31 includes receiving, from the UE, an indication of one or more preferred hopping BWP or CC combinations, and transmitting, to the UE and based on the one or more preferred hopping BWP or CC combinations, the hopping pattern.

Aspect 33 is an apparatus for wireless communication including a transceiver, a memory configured to store instructions, and one or more processors communicatively coupled with the memory and the transceiver, where the one or more processors are configured to perform one or more of the methods of any of Aspects 1 to 32.

Aspect 34 is an apparatus for wireless communication including means for performing one or more of the methods of any of Aspects 1 to 32.

Aspect 35 is a computer-readable medium including code executable by one or more processors for wireless communications, the code including code for performing one or more of the methods of any of Aspects 1 to 32.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software (e.g., executed by a processor), or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. If implemented in software (e.g., executed by a processor), the functions may be stored on or transmitted over as one or more instructions or code on a non-transitory computer-readable medium. Other examples and implementations are within the scope and spirit of the disclosure and appended claims. For example, due to the nature of software, functions described above can be implemented using software (e.g., executed by a specially programmed processor), hardware, hardwiring, or combinations of any of these. Features implementing functions may also be physically located at various positions, including being distributed such that portions of functions are implemented at different physical locations. Also, as used herein, including in the claims, "or" (e.g., as used in a list of items prefaced by "at least one of") indicates a disjunctive list such that, for example, a list of "at least one of A, B, or C" means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
a memory configured to store instructions; and
one or more processors coupled with the memory and the transceiver, wherein the instructions are executable by the one or more processors to cause the apparatus to:
receive an indication of multiple component carriers (CCs) configured for communicating with a base station;
communicate, with the base station and based on the indication, in a first bandwidth part (BWP) within a first one of the multiple CCs during a first time period; and
communicate, with the base station and based on the indication and a hopping pattern, in a second BWP within a second one of the multiple CCs during a second time period.

2. The apparatus of claim 1, wherein the instructions are further executable by the one or more processors to cause the apparatus to communicate, with the base station and based on the hopping pattern, in a third BWP within at least one of the first one of the multiple CCs or a third one of the multiple CCs during a third time period.

3. The apparatus of claim 1, wherein the first one of the multiple CCs and the second one of the multiple CCs are within a same or different frequency band.

4. The apparatus of claim 1, wherein the instructions are further executable by the one or more processors to cause the apparatus to indicate, to the base station, a capability for communicating using certain CCs, wherein the multiple CCs are a subset of the certain CCs.

5. The apparatus of claim 1, wherein the instructions are further executable by the one or more processors to cause the apparatus to maintain at least one of a single hybrid automatic repeat/request (HARQ) process, a single radio link management (RLM) process, a radio resource measurement (RRM), or a beam failure timer for both of the first BWP and the second BWP.

6. The apparatus of claim 1, wherein the instructions are further executable by the one or more processors to cause the apparatus to maintain at least one of a single hybrid automatic repeat/request (HARQ) process, a single radio link management (RLM) process, a radio resource measurement (RRM), or a beam failure timer for both of the first BWP and a third BWP within the first one of the multiple CCs.

7. The apparatus of claim 1, wherein the instructions are further executable by the one or more processors to cause the apparatus to maintain at least one of a single hybrid automatic repeat/request (HARQ) process, a single radio link management (RLM) process, a radio resource measurement (RRM), or a beam failure timer for each of the first BWP and the second BWP.

8. The apparatus of claim 1, wherein the instructions are further executable by the one or more processors to cause the apparatus to determine, based on a configuration received from the base station, whether to maintain at least one of a single hybrid automatic repeat/request (HARQ) process, a single radio link management (RLM) process, a radio resource measurement (RRM), or a beam failure timer for either both of the first BWP and the second BWP, both of the first BWP and a third BWP within the first one of the multiple CCs, or each of the first BWP and the second BWP.

9. The apparatus of claim 1, wherein the instructions are further executable by the one or more processors to cause the apparatus to receive, from the base station in radio resource control (RRC) signaling, a media access control (MAC) control element (CE), or downlink control information (DCI), an indication of the hopping pattern.

10. The apparatus of claim 1, wherein the instructions are further executable by the one or more processors to cause the apparatus to receive, from the base station in radio resource control (RRC) signaling, a media access control (MAC) control element (CE), or downlink control information (DCI), an indication to activate or deactivate the hopping pattern.

11. The apparatus of claim 1, wherein each of the multiple CCs are configured with different subcarrier spacing (SCS).

12. The apparatus of claim 1, wherein the hopping pattern indicates at least one of different hopping durations or different hopping bandwidths within one or more of the multiple CCs.

13. The apparatus of claim 1, wherein the first BWP is configured as an anchor BWP for using when the hopping pattern is deactivated.

14. The apparatus of claim 1, wherein instructions are further executable by the one or more processors to cause the apparatus to determine a switching gap for hopping to the second BWP to communicate in the second time period, wherein determining the switching gap is based on at least one of an indicated capability, or whether the first one of the multiple CCs and the second of the multiple CCs are within a same or different frequency band.

15. The apparatus of claim 1, wherein the instructions are further executable by the one or more processors to cause the apparatus to determine a switching gap for hopping from the first BWP to another BWP to communicate in another time period, wherein determining the switching gap is based on whether the first BWP and the another BWP are within the first one of the multiple CCs or in separate ones of the multiple CCs.

16. The apparatus of claim 1, wherein the instructions are further executable by the one or more processors to cause the apparatus to:
indicate, to the base station, one or more preferred hopping BWP or CC combinations; and
receive, from the base station and based on the one or more preferred hopping BWP or CC combinations, the hopping pattern.

17. An apparatus for wireless communication, comprising:
a transceiver;
a memory configured to store instructions; and
one or more processors coupled with the memory and the transceiver, wherein the instructions are executable by the one or more processors to cause the apparatus to:
configure multiple component carriers (CCs) for communicating with a user equipment (UE);
communicate, with the UE, in a first bandwidth part (BWP) within a first one of the multiple CCs during a first time period; and
communicate, with the UE and based on a hopping pattern, in a second BWP within a second one of the multiple CCs during a second time period.

18. The apparatus of claim 17, wherein the instructions are further executable by the one or more processors to cause the apparatus to communicate, with the UE and based on the hopping pattern, in a third BWP within at least one of the first one of the multiple CCs or a third one of the multiple CCs during a third time period.

19. The apparatus of claim 17, wherein the first one of the multiple CCs and the second one of the multiple CCs are within a same or different frequency band.

20. The apparatus of claim 17, wherein the instructions are further executable by the one or more processors to cause the apparatus to receive, from the UE, an indication of a capability for communicating using certain CCs, wherein the multiple CCs are a subset of the certain CCs.

21. The apparatus of claim 17, wherein the instructions are further executable by the one or more processors to cause the apparatus to receive, from the UE, feedback related to communications for both of the first BWP and the second BWP.

22. The apparatus of claim 17, wherein the instructions are further executable by the one or more processors to cause the apparatus to receive, from the UE, feedback related to communications for both of the first BWP and a third BWP within the first one of the multiple CCs.

23. The apparatus of claim 17, wherein the instructions are further executable by the one or more processors to cause the apparatus to receive, from the UE, feedback related to communications for each of the first BWP and the second BWP.

24. The apparatus of claim 17, wherein the instructions are further executable by the one or more processors to cause the apparatus to transmit, to the UE, a configuration indicating whether to maintain at least one of a single hybrid automatic repeat/request (HARM) process, a single radio link management (RLM) process, a radio resource measurement (RRM), or a beam failure timer for either both of the first BWP and the second BWP, both of the first BWP and a third BWP within the first one of the multiple CCs, or each of the first BWP and the second BWP.

25. The apparatus of claim 17, wherein the instructions are further executable by the one or more processors to cause the apparatus to transmit, to the UE in radio resource control (RRC) signaling, a media access control (MAC) control element (CE), or downlink control information (DCI), an indication of the hopping pattern.

26. The apparatus of claim 17, wherein the instructions are further executable by the one or more processors to cause the apparatus to transmit, to the UE in radio resource control (RRC) signaling, a media access control (MAC) control element (CE), or downlink control information (DCI), an indication to activate or deactivate the hopping pattern.

27. A method for wireless communication, comprising:
receiving, by a user equipment, an indication of multiple component carriers (CCs) configured for communicating with a base station;
communicating, with the base station and based on the indication, in a first bandwidth part (BWP) within a first one of the multiple CCs during a first time period; and
communicating, with the base station and based on the indication and a hopping pattern, in a second BWP within a second one of the multiple CCs during a second time period.

28. The method of claim 27, further comprising, communicating, with the base station and based on the hopping pattern, in a third BWP within at least one of the first one of the multiple CCs or a third one of the multiple CCs during a third time period.

29. A method for wireless communication, comprising:
configuring multiple component carriers (CCs) for communicating with a user equipment (UE);
communicating, with the UE, in a first bandwidth part (BWP) within a first one of the multiple CCs during a first time period; and
communicating, with the UE and based on a hopping pattern, in a second BWP within a second one of the multiple CCs during a second time period.

30. The method of claim 29, further comprising, communicating, with the UE and based on the hopping pattern, in a third BWP within at least one of the first one of the multiple CCs or a third one of the multiple CCs during a third time period.

* * * * *